United States Patent
Ernest et al.

(10) Patent No.: US 11,128,139 B2
(45) Date of Patent: Sep. 21, 2021

(54) POWER ELECTRONICS CONDITIONING SYSTEM WITH HALF-WINDING GENERATOR SETUP

(71) Applicant: Cummins Power Generation Ltd. (UK), Ramsgate (GB)

(72) Inventors: Emil Ernest, Stamford (GB); Krzysztof Paciura, Peterborough (GB); Bradford K. Palmer, Ham Lake, MN (US)

(73) Assignee: Cummins Power Generation Ltd. (UK), Ramsgate (GB)

( * ) Notice: Subject to any disclaimer, the term of this patent is extended or adjusted under 35 U.S.C. 154(b) by 0 days.

(21) Appl. No.: 16/758,316

(22) PCT Filed: Oct. 22, 2018

(86) PCT No.: PCT/IB2018/058212
§ 371 (c)(1),
(2) Date: Apr. 22, 2020

(87) PCT Pub. No.: WO2019/082059
PCT Pub. Date: May 2, 2019

(65) Prior Publication Data
US 2020/0259331 A1    Aug. 13, 2020

Related U.S. Application Data

(60) Provisional application No. 62/575,920, filed on Oct. 23, 2017.

(51) Int. Cl.
*H02J 3/32*    (2006.01)
*H02J 3/18*    (2006.01)
*H02J 3/38*    (2006.01)

(52) U.S. Cl.
CPC .............. *H02J 3/32* (2013.01); *H02J 3/1842* (2013.01); *H02J 3/381* (2013.01); *H02J 2300/20* (2020.01)

(58) Field of Classification Search
CPC .............. H02J 3/32; H02J 3/1842; H02J 3/381
See application file for complete search history.

(56) References Cited

U.S. PATENT DOCUMENTS

| | | | | |
|---|---|---|---|---|
| 6,555,992 B2 * | 4/2003 | Asao | ....................... | H02P 9/307 322/28 |
| 6,847,185 B2 * | 1/2005 | Kume | ................... | H02P 25/188 318/732 |
| 2011/0316462 A1 | 12/2011 | Bouchez et al. | | |

FOREIGN PATENT DOCUMENTS

| | | |
|---|---|---|
| DE | 10 2015 218 416 | 3/2017 |
| WO | WO-2015/150740 | 10/2015 |

OTHER PUBLICATIONS

International Search Report and Written Opinion for International Application No. PCT/IB2018/058212, dated Jan. 29, 2019, 13 pages.

\* cited by examiner

*Primary Examiner* — Viet P Nguyen
(74) *Attorney, Agent, or Firm* — Foley & Lardner LLP (57) ABSTRACT

A power generation system (100) including an inverter (140) structured to convert a direct current (DC) power output from an external source (110) to an alternating current (AC) power. The inverter includes at least one phase for converting the DC power to a corresponding phase of AC power. The system also includes an alternator (124) of a generator set (120). The alternator includes at least one phase, each comprising a first winding section and a second winding (Continued)

section coupled in series between a point of common coupling and an output terminal of the phase. A phase of the inverter is connected in parallel with the first winding section of the alternator. The inverter is configured to provide reactive power compensation, power factor correction or acts as an active filter to provide harmoincs damping and the system can be used to buffer and handle grids transients.

20 Claims, 3 Drawing Sheets

POWER ELECTRONICS CONDITIONING SYSTEM WITH HALF-WINDING GENERATOR SETUP

CROSS-REFERENCE TO RELATED PATENT APPLICATIONS

This application claims priority to U.S. Provisional Application No. 62/575,920, filed Oct. 23, 2017, which is incorporated herein by reference in its entirety.

TECHNICAL FIELD

The present disclosure generally relates to power generation systems.

BACKGROUND

Autonomous alternating current (AC) micro-grids have been widely used in power generation and distribution systems. An autonomous AC micro-grid often includes a generator set (also referred to as "genset"), which may have an engine powered by fuel. The engine may be operatively coupled to an alternator, and the alternator may be configured to generate electrical energy for providing power to the autonomous AC micro-grid.

A hybrid power generation system may include one or more supplemental power sources for providing power to an autonomous AC micro-grid. A supplemental power source may relate to an alternative energy system, which may include a renewable energy source (e.g., solar energy, wind energy) or an energy storage device (e.g., battery pack, ultra-capacitor). In order to supply power to load, a renewable energy source and/or an energy storage device can be coupled to an autonomous AC micro-grid through a direct current (DC) to alternating current (AC) inverter. There is a challenge of achieving the desirable operation for the hybrid power generation system.

SUMMARY

In one aspect, the inventive concepts disclosed herein are directed to a power generation system comprising an inverter and a generator set. The inverter is configured to convert a direct current (DC) power from an external power source to an alternating current (AC) power. The inverter includes at least one phase for converting the DC power to a corresponding phase of AC power. The generator set includes an alternator. The alternator includes at least one phase, wherein each phase of the alternator comprises a first winding section and a second winding section coupled in series between a point of common coupling and an output terminal of the phase. Each phase of the inverter corresponds to one phase of the alternator and is connected in parallel with the first winding section of the corresponding phase of the alternator.

In some embodiments, the inverter includes three phases and the alternator includes three phases. In some embodiments, at least one phase of the inverter includes an LC filter circuit, and the LC filter circuit and the first winding section of the corresponding phase of the alternator are configured to form an LCL filter circuit.

In some embodiments, the generator set is configured to supply power to a load via a PCC (power command control) network, and the power generation system further includes a controller configured to operate the generator set and the inverter according to one of a first mode, a second mode, and a third mode. The first mode corresponds to the generator set providing power the load, the second mode corresponds to the external power source providing power the load through the inverter and the third mode corresponds to a hybrid load sharing mode.

In some embodiments, the hybrid load sharing mode relates to a period of high power demand of the load, wherein the external power source and the generator set are configured to provide power to the load. In some embodiments, the hybrid load sharing mode relates to a low energy level of the external power source, wherein the external power source is configured to supply reactive power to the load and the generator set is configured to decrease a supply of reactive power to the load.

In some embodiments, the power generation system further includes an AC micro-grid configured to connect to a grid network. The AC micro-grid includes the generator set, wherein the external power source is coupled to the AC micro-grid through the inverter. In some embodiments, the AC micro-grid corresponds to a recreational vehicle.

In some embodiments, the external power source corresponds to an energy storage device. In some embodiments, the external power source corresponds to a renewable energy device.

In a further aspect, the inventive concepts disclosed herein are directed to a power generation system comprising an external power source, an inverter, an AC micro-grid, and a load. The inverter is configured to convert a direct current (DC) power from an external power source to an alternating current (AC) power. The inverter includes at least one phase for converting the DC power to a corresponding phase of AC power. The AC micro-grid is configured for connection to a grid via a power command control (PCC) network. The AC micro-grid includes a generator set, and the generator set includes an alternator. The alternator includes at least one phase, wherein each phase of the alternator comprises a first winding section and a second winding section coupled in series between a point of common coupling and an output terminal of the phase. Each phase of the inverter corresponds to one phase of the alternator and is connected in parallel with the first winding section of the corresponding phase of the alternator. The load is configured for connection to the grid network via the PCC network, and to receive AC power from at least one of the generator set and the external power source.

In some embodiments, the inverter includes three phases and the alternator includes three phases. In some embodiments, at least one phase of the inverter includes an LC filter circuit, and the LC filter circuit and the first winding section of the corresponding phase of the alternator are configured to form an LCL filter circuit.

In some embodiments, the power generation system further includes a controller configured to operate the generator set and the inverter according to one of a first mode, a second mode, and a third mode. The first mode corresponds to the generator set providing power the load, the second mode corresponds to the external power source providing power the load through the inverter, and the third mode corresponds to a hybrid load sharing mode. In some embodiments, the hybrid load sharing mode relates to a period of high power demand of the load, wherein the external power source and the generator set are configured to provide power to the load. In some embodiments, the hybrid load sharing mode relates to a low energy level of the external power source, wherein the external power source is configured to supply reactive power to the load and the generator set is configured to decrease a supply of reactive power to the load.

In some embodiments, the external power source corresponds to an energy storage device. In some embodiments, the external power source corresponds to a renewable energy device. In some embodiments, the external power source is coupled to the AC micro-grid through the inverter. In some embodiments, the AC micro-grid corresponds to a recreational vehicle.

These and other features, together with the organization and manner of operation thereof, will become apparent from the following detailed description when taken in conjunction with the accompanying drawings.

DETAILED DESCRIPTION

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended, any alternations and further modifications in the illustrated embodiments, and any further applications of the principles of the disclosure as illustrated therein as would normally occur to one skilled in the art to which the disclosure relates are contemplated herein.

Referring to the Figures generally, various embodiments disclosed herein relate to a hybrid power generation system including a generator set (genset) operating in conjunction with an external power source. The genset can power an autonomous alternating current (AC) micro-grid that supplies power to distributed loads. The genset may include, for example, a wound-field synchronous alternator driven by a diesel engine. The alternator includes at least one phase of AC power. Each phase of the alternator includes a first winding section and a second winding section coupled in series between a point of common coupling and an output terminal of the phase.

In some embodiments, the external power source may include, for example, a renewable energy source (e.g., solar energy, wind energy) or an energy storage device (e.g., battery, ultra-capacitor). The external power source is coupled to the AC-grid through an inverter structured to convert DC power output from the external power source into AC power. The inverter has at least one phase, and each phase can convert the DC power into a corresponding phase of AC power. A phase of the inverter is connected in parallel with the first winding section of a corresponding phase of the alternator. In some embodiments, each phase of the inverter includes an LC filter consisting of an inductor and a capacitor. The LC filter of the inverter and the first winding section of the corresponding phase of the alternator can form an LCL filter for filtering the harmonics of the inverter, thereby achieving improved operation of the hybrid power generation system.

In some embodiments, the system disclosed herein can be used to buffer and handle grid transients, for example to facilitate meeting grid codes and low voltage ride through (LVRT) requirements. In some implementations, the system may include an inverter configured to provide a load to absorb excess power in response to an LVRT event, to provide power for sudden load transients, to provide power factor correction of genset output, to provide harmonics damping, to provide genset output/control stabilization, to buffer mechanical shock to genset, etc. The inverter can lower spinning reserve requirements by quickly absorbing load transients, reducing the need for oversizing a genset to handle transients and/or running at inefficient operation settings. This may increase efficiency and lower emissions by use of a smaller genset, etc. The system can enable gradual load take-up/response by the genset, which may provide various benefits such as saving fuel, avoiding excess emissions, reducing noise and/or human perception of the load change, providing an easier control problem via allowing a slower response, less mechanical stress on engine, etc.

In some embodiments, the inverter may be coupled to a battery or capacitor bank, and the inverter can perform in-phase balance correction of the alternator by loading low utilized phases (to charge) or by boosting overloaded phase output (to lower alternator damage curve or lengthen time alternator can spend in overload by unloading the most heavily loaded phase and balancing the transient output). In some embodiments, the inverter can also be actively operated to counter/filter unwanted harmonics in the genset output. In some embodiments, the inverter would be operating through the coupling ratio of the genset output to the number of center tap turns, and control of the inverter voltage output (or input if bi-directional) may be adjusted accordingly.

Figure 1:
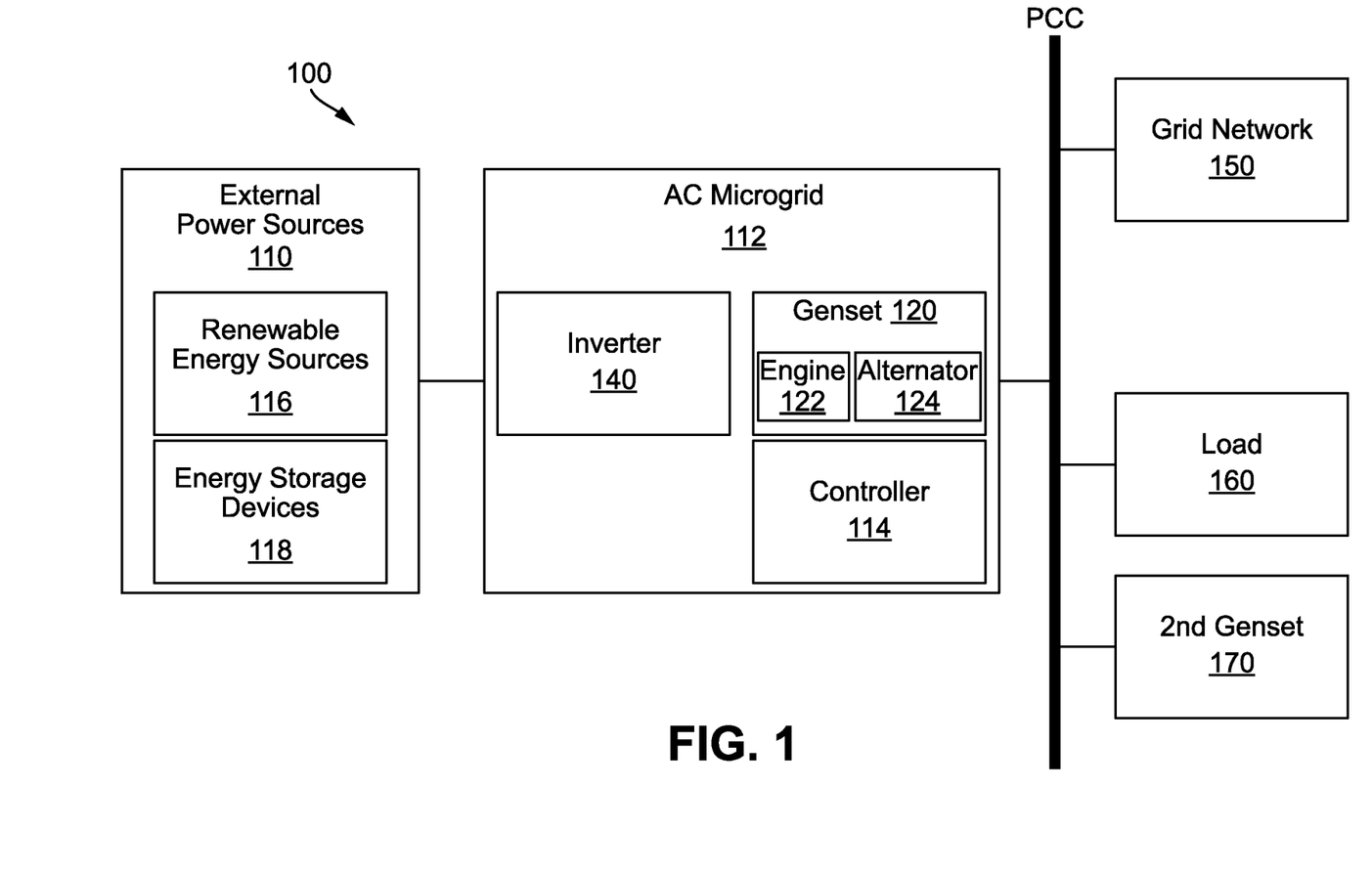
FIG. 1 is a block diagram of a power generation system, according to an example embodiment.

Referring now to FIG. 1, a schematic diagram of a hybrid power generation system 100 is shown according to an example embodiment. The hybrid power generation system 100 includes an AC micro-grid (e.g., the autonomous AC micro-grid) 112 connected to a grid network 150 via a power command control (PCC) network. The hybrid power generation system 100 also includes an external source 110 coupled to the AC micro-grid 112 through an inverter 140. The AC micro-grid 112 can supply power to distributed loads (e.g., the load 160) via the PCC network. The load 160 may include various types of electric equipment, such as one or more air conditioners, lighting, kitchen appliance, entertainment devices, and/or other different devices. Power demand of the load 160 may vary over time. For example, power demand of the load 160 may be light when most electric devices are turned off, or may be high when most electric devices are turned on. Another genset 170 can also be connected to the grid network 150 as a power source. It should be understood that although one load 160 and one other genset 170 are shown in the illustrated example, there may be multiple loads and gensets coupled to the grid network 150.

In some embodiments, the AC micro-grid 112 may be implemented on vehicles (e.g., RV's), stationary facilities, industrial work machines, and so on. The AC micro-grid 112 can be powered by a genset 120 and supplemented by power supplied from the external source 110. In the illustrated embodiment, the genset 120 includes an engine 122 as a prime mover and an alternator 124 as an electric machine coupled to and driven by the engine 122. The engine 122 may include an internal combustion engine or any other suitable prime mover that consumes fuel (e.g., gasoline, diesel fuel, natural gas, etc.) during operation and provides a mechanical energy (e.g., a rotational torque) to drive the alternator 124 through, for example, a crankshaft.

The alternator 124 is operatively coupled to the engine 122 and may be powered by the engine 122 to generate electric power for running, for example, the load 160. The alternator 124 may include an induction machine, a switched reluctance machine, or any other suitable electric motor or generator capable of generating electrical output in response to mechanical input, or mechanical output in response to electrical input. In some embodiments, the alternator 124 may be a starter/alternator, integrating the functions of a starter motor and an alternator used in the engine 122. In some embodiments, alternator 124 is a wound-field synchronous generator (WFSG) driven by a diesel engine. The genset 120 may operate at a fixed speed to produce electricity at a grid frequency. In some embodiments, the rated rotational speed of the engine 122 and the alternator 124 is 1500 rpm for 50 Hz grid applications, or 1800 (or 1200) rpm for 60 Hz grid applications.

The controller 114 is communicably coupled to the genset 120, the inverter 140, and/or any other component or device of the AC micro-grid 112. In some embodiments, the controller 114 is communicably coupled to one or more of the external power sources 110. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections.

The controller 114 may be implemented as a general-purpose processor, an application specific integrated circuit (ASIC), one or more field programmable gate arrays (FPGAs), a digital signal processor (DSP), a group of processing components, or other suitable electronic processing components. In some embodiments, the controller 114 may include one or more memory device (e.g., NVRAM, RAM, ROM, Flash Memory, hard disc storage, etc.) that stores data and/or computer code for facilitating the various processes executed by the controller 114. The one or more memory devices may be or include tangible, non-transient volatile memory or non-volatile memory, database components, object code components, script components, or any other type of information structure for supporting the various activities and information structures described herein. In some embodiments, the controller 114 may be integrated as part of the genset 120 (e.g., an engine controller). In other embodiments, the controller 114 may be a standalone device.

The external power source 110 may include a renewable energy source 116, such as a solar energy source and/or a wind energy source. The external power source 110 may include an energy storage device 118, such as a battery pack and/or an ultra-capacitor. Any number of renewable energy sources 116 and/or energy storage devices 118 may be provided in various embodiments. In some embodiments, the external power source 110 is configured to provide a DC power output.

The external power source 110 is coupled to the AC micro-grid 112 through the inverter 140 (also called power electronics conditioning system) for supplementing the power supply of the genset 120. The inverter 140 may include one or more phases. In the illustrated embodiment, the inverter 140 has three phases, each corresponding to a phase of the alternator 124. Structural details of the inverter 140 are described below with reference to FIG. 3. It is noted that the inverter 140 in various embodiments can be a single direction output inverter, a bi-directional inverter, or an output inverter paired with a passive rectifier to allow bi-directional operation.

Figure 2:
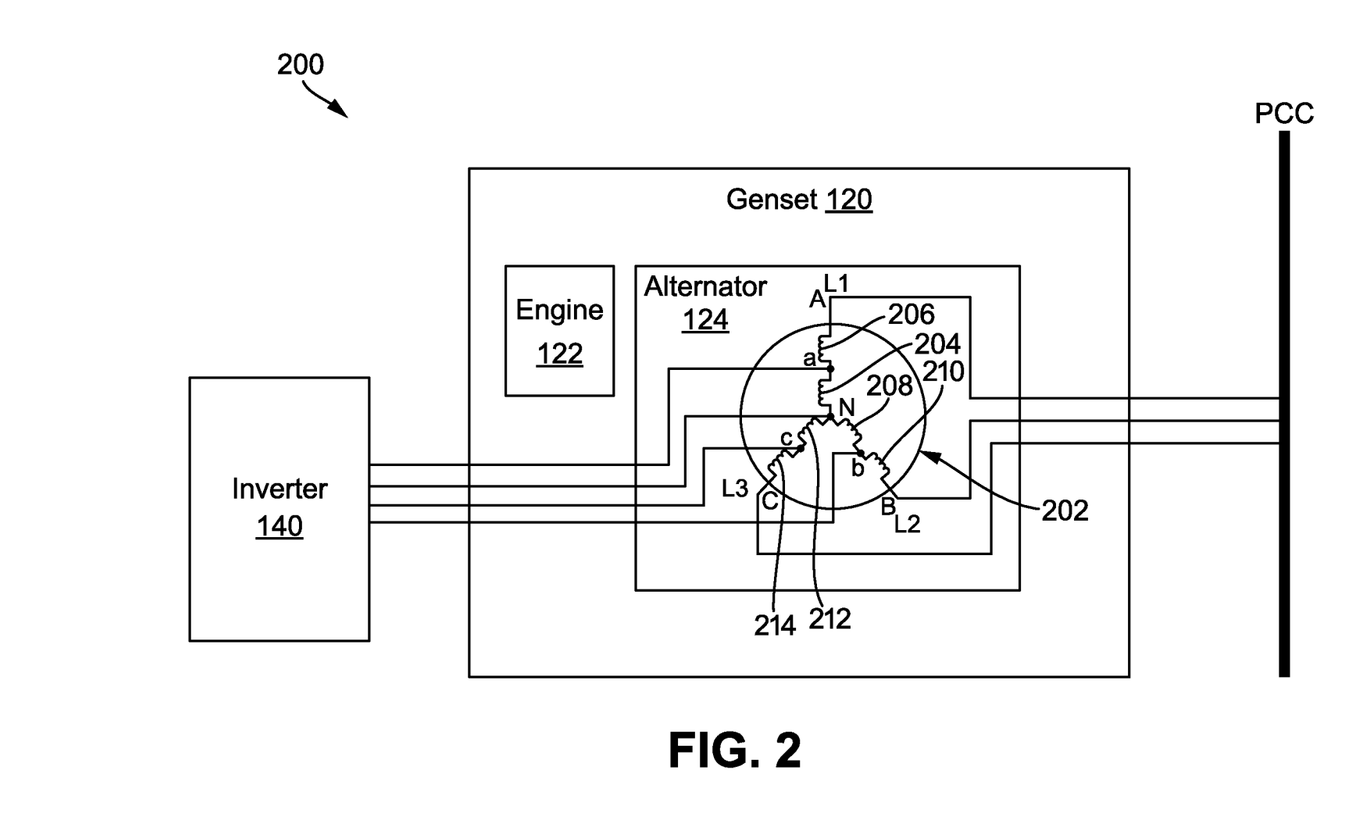
FIG. 2 is a schematic diagram of a generator set of the power generation system of FIG. 1, according to an example embodiment.

Referring to FIG. 2, the genset 120 is shown in greater detail. The genset 120 is shown to include an engine 122 and an alternator 124. In some embodiments, the alternator 124 includes a rotor (not shown in the present Figure) and a stator 202. Other alternator components are omitted in the Figure for the ease of explaining. The rotor may be a permanent magnet or field coils structured to generate a magnetic field. The stator 202 may include windings wound on iron cores (i.e., the armature windings). Although three-phase windings L1, L2, and L3 are shown in FIG. 2 for illustration, it should be understood that the stator 202 may include windings of any suitable phases and constructed of any suitable material. In some embodiments, the rotor may be surrounded by the armature windings L1, L2, and L3 of the stator 202. The engine 122 can drive the rotor to rotate, thereby generating a moving magnetic field around the stator 202 and inducing a voltage difference between two ends of each winding of the stator 202.

As shown in FIG. 2, the three phases of windings L1, L2, and L3 are in a wye ("Y") connection (also called a "star" connection), in which one terminal of each winding is connected to a common coupling point (also known as common neutral) N while the other terminal (e.g., A, B, C) of the winding is connected to the PCC network for outputting a voltage. In some embodiments, there is a 120-degree difference in phase between any two phases. That is, the voltage on the first winding L1 is 120-degree ahead of (or behind) the voltage on the second winding L2, the voltage on the second winding L2 is 120-degree ahead of (or behind) the voltage on the third winding L3, and the voltage on the third winding L3 is 120-degree ahead of (or behind) the voltage on the first winding L1. Each winding includes a first winding section and a second winding section coupled in series between the point of common coupling N and the output terminal of the phase. For example, the first winding L1 includes a first winding section 204 and a second winding section 206 coupled in series between the common coupling point N and the output terminal A, the second winding L2 includes a first winding section 208 and a second winding section 210 coupled in series between N and the output terminal B, and the third winding L3 includes a first winding section 212 and a second winding section 214 coupled in series between N and the output terminal C.

The hybrid power generation system 100 can be configured to supply power to the load 160 in various operation modes, such as the genset only operation mode, the hybrid load sharing operation mode, and the external power source only operation mode. In some embodiments, the controller 114 is configured to facilitate supplying power to the load 160, for example by configuring operation of the genset 120, the inverter 140, and/or any other component of the hybrid power generation system 100.

In the genset only operation mode, the external power source 110 may be at an OFF state and/or disconnected from the AC micro-grid 112, as a result of, for example, insufficient energy level available from the external power source 110. The genset 120 alone in the AC micro-grid 112 supplies power to the load 160. When power demand of the load 160 is changing, the engine 122 is kept running at a fixed speed. For example, the engine 122 may run at 1500 rpm for 50 Hz grid applications. The engine 122 may run at 1800 (or 1200) rpm for 60 Hz grid applications. An automatic voltage regulator (AVR, not shown in the present Figures) of the alternator 124 regulates the magnitude of AV voltages on the three phases L1, L2, and L3 to keep the voltages within predefined limits. The genset 120 delivers active power $P_g$ and reactive power $Q_g$ to the load 160. In some embodiments, the total system output active power $P_t$ is equal to active power $P_g$, and output reactive power $Q_t$ is equal to the reactive power $Q_g$.

The hybrid load sharing operation mode may be associated with the external power source 110 having sufficient energy level over a period of time, such as to allow the external power source 110 to supplement power supply of the genset 120 when the power demand of the load 160 is high. It should be understood that the hybrid load sharing operation mode may also be associated with the energy level of the external power source 110 being low, but the primary function of the external power source 110 would be supplying reactive power $Q_i$ to reduce reactive power $Q_g$ drawn from the genset 120. Both the genset 120 and the external power source 110 (through the inverter 140) are delivering active and reactive power to an AC bus of the AC micro-grid 112. As a result, the total system output active power $P_t$ demanded by the load 160 is shared between the genset 120 and the external power source 110 (through the inverter 140), according to the following equations:

$$P_t = k_P P_g + (1-k_P) P_i,$$

wherein $k_P$ is a ratio factor for active power sharing, and $P_i$ is the active power delivered by the external power source 110 through the inverter 140. Similarly, the total system output reactive power $Q_t$ demanded by load 160 is:

$$Q_t = k_Q Q_g + (1-k_Q) Q_i,$$

wherein $k_Q$ is a ratio factor for reactive power sharing, and $Q_i$ is the active power delivered by the external power source 110 through the inverter 140.

The external power source only operation mode may be associated with sufficient energy level available from the external power source 110, and/or light power demand of the load 160. The genset 120 can be disconnected from the AC micro-grid 112, leaving the external power source 110 alone to supply power to the load 160 (through the inverter 140). Both total system output active power $P_t$ and total system output reactive $Q_t$ are delivered only by the external power source 110 through the inverter 140.

In some embodiments, a period of high power demand and/or low power demand may be determined by comparison to one or more threshold values. In some embodiments, a period of high power demand may be determined when a voltage level and/or voltage change of the grid network 150 exceeds a threshold value. For example, a period of high power demand may be determined when a measured voltage exceeds a particular voltage value and/or when a voltage change exceeds a predetermined percentage value. A period of low power demand may be similarly determined (e.g., when a measured voltage is less than a particular voltage value). A period of high and/or low power demand may be determined using any suitable manner.

In some embodiments in which the external power source 110 includes an energy storage device (e.g., the energy storage device 118), the energy storage device may be configured to provide power to supplement the power generated by the genset 120 (e.g., in periods of high demand) and store excess power generated by the genset 120 (e.g., in periods of low demand).

In some embodiments, one or more of the operation modes of the hybrid power generation system 100 can be additionally or alternatively configured to buffer and handle grid transients, for example to facilitate meeting grid codes and low voltage ride through (LVRT) requirements. In some implementations, the system 100 may include an inverter (e.g., the inverter 140) configured to provide a load to absorb excess power in response to an LVRT event, to provide power for sudden load transients, to provide power factor correction of the genset output, to provide harmonics damping, to provide output/control stabilization of the genset 120, to buffer mechanical shock to the genset 120, etc. The inverter can lower spinning reserve requirements by quickly absorbing load transients, reducing the need for oversizing a genset to handle transients and/or running at inefficient operation settings. The system 100 can be configured to enable gradual load take-up/response by the genset 120, which may provide various benefits such as saving fuel, avoiding excess emissions, reducing noise and/or human perception of the load 160 change, providing an easier control problem via allowing a slower response, less mechanical stress on the engine 122, etc.

In some embodiments, the inverter may be coupled to a battery or capacitor bank (e.g., of the external source 110), and the inverter can perform in-phase balance correction of the alternator 124 by loading low utilized phases (to charge) or by boosting overloaded phase output (to lower alternator damage curve or lengthen time the alternator 124 can spend in overload by unloading the most heavily loaded phase and balancing the transient output). In some embodiments, the inverter can also be actively operated to counter/filter unwanted harmonics in the genset output. In some embodiments, the inverter would be operating through the coupling ratio of the genset output to the number of center tap turns, and control of the inverter voltage output (or input if bi-directional) may be adjusted accordingly.

Figure 3:
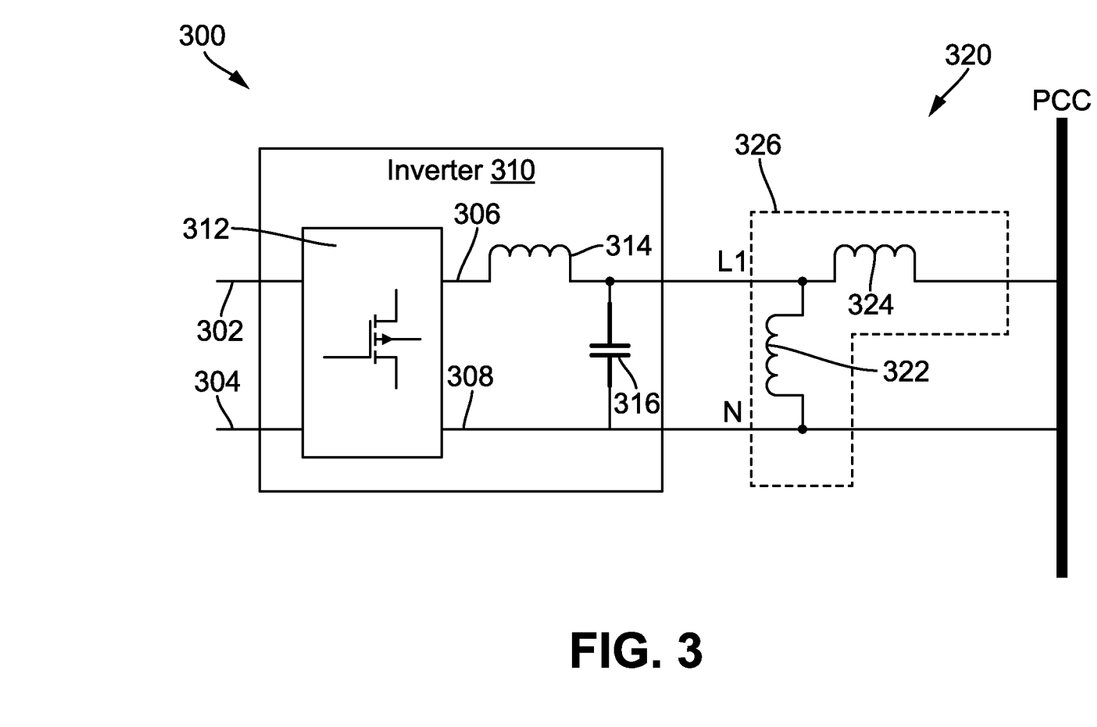
FIG. 3 is a schematic diagram showing one phase of an inverter in connection with a corresponding phase of an alternator of the power generation system of FIG. 1, according to an example embodiment.

Referring to FIG. 3, a schematic diagram 300 shows one phase of an inverter 310 in connection with a corresponding phase (L1) of an alternator 320. In some embodiments, the inverter 310 and the alternator 320 correspond to the inverter 140 and the alternator 124, respectively. It should be understood that although only one phase is shown in FIG. 3, the inverter 310 may include any suitable number of phases, each phase being connected to a corresponding phase of the alternator 320.

As shown, a phase of the inverter 310 includes two DC buses 302 and 304, which can be connected to the external power source 110 and receive the DC power output from the external power source 110. Power electronics 312 in the inverter 310 can convert the DC power received from the DC buses 302 and 304 to AC voltage of appropriate magnitude, frequency, and phase and output the AC voltage on the AC buses 306 and 308. In some embodiments, the power electronics 312 can synchronize the magnitude, frequency, and/or phase of the AC voltage to the voltage of the AC micro-grid 112. In some embodiments, each phase of the inverter 310 includes a half bridge consisting of two switch elements connected in series between the DC buses 302 and 304. The switch elements can be, for example, metal oxide semiconductor field effect transistor (MOSFET) switches, insulated gate bipolar transistor (IGBT) switches, gated thyristors, silicon controller rectifiers (SCR), as well as a variety of other devices.

In some embodiments, the ON/OFF state of each switch element may be controlled by, for example, a pulse width modulation (PWM) controller (not illustrated in the present Figure). In particular, the PWM controller may generate sequential pulses to selectively and individually drive each gate of the switch elements, causing the switch element to switch between an ON and OFF state, in order to generate an AC voltage (e.g., sine-wave voltage).

In some embodiments in which the alternator 320 has three phases with 120-degree difference between any two phases. Each phase of the inverter 310 may be controlled to generate the AC voltage of corresponding phase angle, to synchronize with the corresponding phase of the alternator 320. It should be understood that the PWM controller may be configured and implemented as software (e.g., firmware), hardware, or combination thereof. It should also be understood that each phase of the inverter 310 may have a separate PWM controller or a single controller may be configured to control more than one phase of the inverter 310 independently.

In some embodiments, at least one phase of the inverter 310 includes an LC filter comprising of an inductor 314 and a capacitor 316. The inductor 314 and the capacitor 316 may be configured for filtering harmonics from the AC voltage output by the power electronics 312. The harmonics may be caused by the switching of the power electronics 312 and may damage sensitive equipment or the connected load, such as in applications above several kilowatts. Any suitable inductor 314 may be provided with any suitable inductance rating, and any suitable capacitor 316 may be provided with any suitable capacitance rating. In some embodiments, a rating of each of the inductor 314 and the capacitor 316 are selected according to desired filter characteristics as described herein. In some embodiments, the inductor 314 and the capacitor 316 may be omitted.

The inductor 314 and the capacitor 316 are coupled in series between the AC buses 306 and 308. When connected to the corresponding phase L1 of the alternator 320, the capacitor 316 is coupled in parallel with the first winding section 322, and the capacitor 316 is coupled in series with the second winding section 324 as shown in FIG. 3. The AC bus 306 may be coupled to the common coupling point N of the alternator 320.

In FIG. 3, the inductor 314, the capacitor 316, and the first winding section 322 form an LCL filter for filtering the AC voltage output to the PCC network. The LCL filter may have various advantages over an LC filter formed by the inductor 314 and the capacitor 316. For example, the LCL filter can produce better attenuation of power electronics switching harmonics than the LC filter. The LCL filter may have lower grid current distortion and reactive power production relative to the LC filter. The LCL filter can use a relatively low switching frequency for a given harmonic attenuation. It is noted that in some embodiments, the inductor 314 may be omitted from the inverter 310, and an LCL filter may be formed by directly connecting the inverter output (AC buses 306 and 308) with the windings 324 and 322 of the alternator 320.

As may be utilized herein, the terms "about" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein to mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "middle," "above," "below," etc.) are merely used to describe the position of various elements in the drawings. It should be noted that the position of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

While this specification contains specific implementation details, these should not be construed as limitations on the scope of any inventions or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in a particular order, this should not be understood as requiring that such operations be performed in the particular order shown or in sequential order, or that all operations be performed, to achieve desirable results. Moreover, the separation of various aspects of the implementations described above should not be understood as requiring such separation in all implementations, and it should be understood that the described methods can generally be integrated in a single application or integrated across multiple applications.

What is claimed is:

1. A power generation system comprising:
an inverter configured to convert a direct current (DC) power from an external power source to an alternating current (AC) power, the inverter comprising at least one phase for converting the DC power to a corresponding phase of AC power; and
a generator set having an alternator, the alternator comprising at least one phase, wherein each phase of the alternator comprises a first winding section and a second winding section coupled in series between a point of common coupling and an output terminal of the phase;
wherein each phase of the inverter corresponds to one phase of the alternator and is connected in parallel with the first winding section of the corresponding phase of the alternator.

2. The power generation system of claim 1, wherein the inverter comprises three phases and the alternator comprises three phases.

3. The power generation system of claim 1, wherein the generator set is configured to supply power to a load via a power command control (PCC) network.

4. The power generation system of claim 1, wherein the power generation system further comprises a controller configured to operate the generator set and the inverter according to one of a first mode, a second mode, and a third mode;
wherein the controller is configured to cause the generator set to provide power to the load in the first mode, wherein the controller is configured to control the inverter to provide power from the external power source to the load in the second mode, wherein the controller is configured to control the generator set and the inverter to power the load from both the generator set and the external power source in the third mode.

5. The power generation system of claim 4, wherein the controller is configured to operate the generator set and the inverter in the third mode in response to a power demand of the load exceeding a threshold value.

6. The power generation system of claim 4, wherein the controller is configured to operate the generator set and the inverter in the third mode in response to an energy level of the external power source being less than a threshold value, wherein the external power source is configured to supply reactive power to the load and the generator set is configured to decrease a supply of reactive power to the load.

7. The power generation system of claim 1, wherein the generator set is configured for connection to an AC micro-grid electrically connected to a grid, and wherein the inverter is configured to connect the external power source to the AC micro-grid.

8. The power generation system of claim 1, wherein at least one phase of the inverter comprises an LCL filter circuit, wherein the at least one phase of the inverter comprises an LC filter circuit, and wherein the LC filter circuit and the first winding section of the corresponding phase of the alternator are configured to form the LCL filter circuit.

9. A controller for a power generation system, the power generation system comprising a generator set having an alternator comprising at least one phase, the controller configured to:
operate the generator set and an inverter according to one of a first mode, a second mode, and a third mode, wherein the inverter is configured to convert a direct current (DC) power from an external power source to an alternating current (AC) power, the inverter comprising at least one phase for converting the DC power to a corresponding phase of AC power;
wherein each phase of the alternator comprises a first winding section and a second winding section coupled in series between a point of common coupling and an output terminal of the phase,
wherein each phase of the inverter corresponds to one phase of the alternator and is connected in parallel with the first winding section of the corresponding phase of the alternator,
wherein the controller is configured to cause the generator set to provide power to a load in the first mode, wherein the controller is configured to control the inverter to provide power from the external power source to the load in the second mode, wherein the controller is configured to control the generator set and the inverter to power the load from both the generator set and the external power source in the third mode.

10. The controller of claim 9, wherein the inverter comprises three phases and the alternator comprises three phases.

11. The controller of claim 9, wherein the controller is configured to operate the generator set and the inverter in the third mode in response to a power demand of the load exceeding a threshold value.

12. The controller of claim 9, wherein the controller is configured to operate the generator set and the inverter in the third mode in response to an energy level of an external power source being less than a threshold value.

13. The controller of claim 12, wherein the controller is configured to operate the generator set to decrease a supply of reactive power to the load.

14. The controller of claim 13, wherein the controller is configured to determine the decreased supply of reactive power based on an increased supply of reactive power provided to the load by an external power source.

15. The controller of claim 9, wherein the controller is configured to operate the generator set for connection to an AC micro-grid electrically connected to a grid.

16. A power generation system comprising:
an inverter configured to convert a direct current (DC) power from an energy storage device to an alternating current (AC) power, the inverter comprising at least one phase for converting the DC power to a corresponding phase of AC power;
a generator set configured to supply power to a load, the generator set having an alternator, the alternator comprising at least one phase, wherein each phase of the alternator comprises a first winding section and a second winding section coupled in series between a point of common coupling and an output terminal of the phase, wherein each phase of the inverter corresponds to one phase of the alternator and is connected in parallel with the first winding section of the corresponding phase of the alternator; and
a controller configured to operate the generator set and the inverter to provide power to the load from both the generator set and the energy storage device in response to a power demand of the load exceeding a threshold value.

17. The power generation system of claim 16, wherein the controller is configured to operate the inverter to charge the energy storage device in response to a power demand of the load being less than a threshold value.

18. The power generation system of claim 16, wherein the controller is configured to operate the inverter to provide active harmonics damping of an output of the generator set.

19. The power generation system of claim 16, wherein at least one phase of the inverter comprises an LCL filter circuit configured to passively reduce harmonics of the inverter, wherein the at least one phase of the inverter comprises an LC filter circuit, and wherein the LC filter circuit and the first winding section of the corresponding phase of the alternator are configured to form the LCL filter circuit.

20. The power generation system of claim 16, wherein the inverter is configured to provide power factor correction of an output of the generator set.

\* \* \* \* \*